United States Patent Office 3,448,168
Patented June 3, 1969

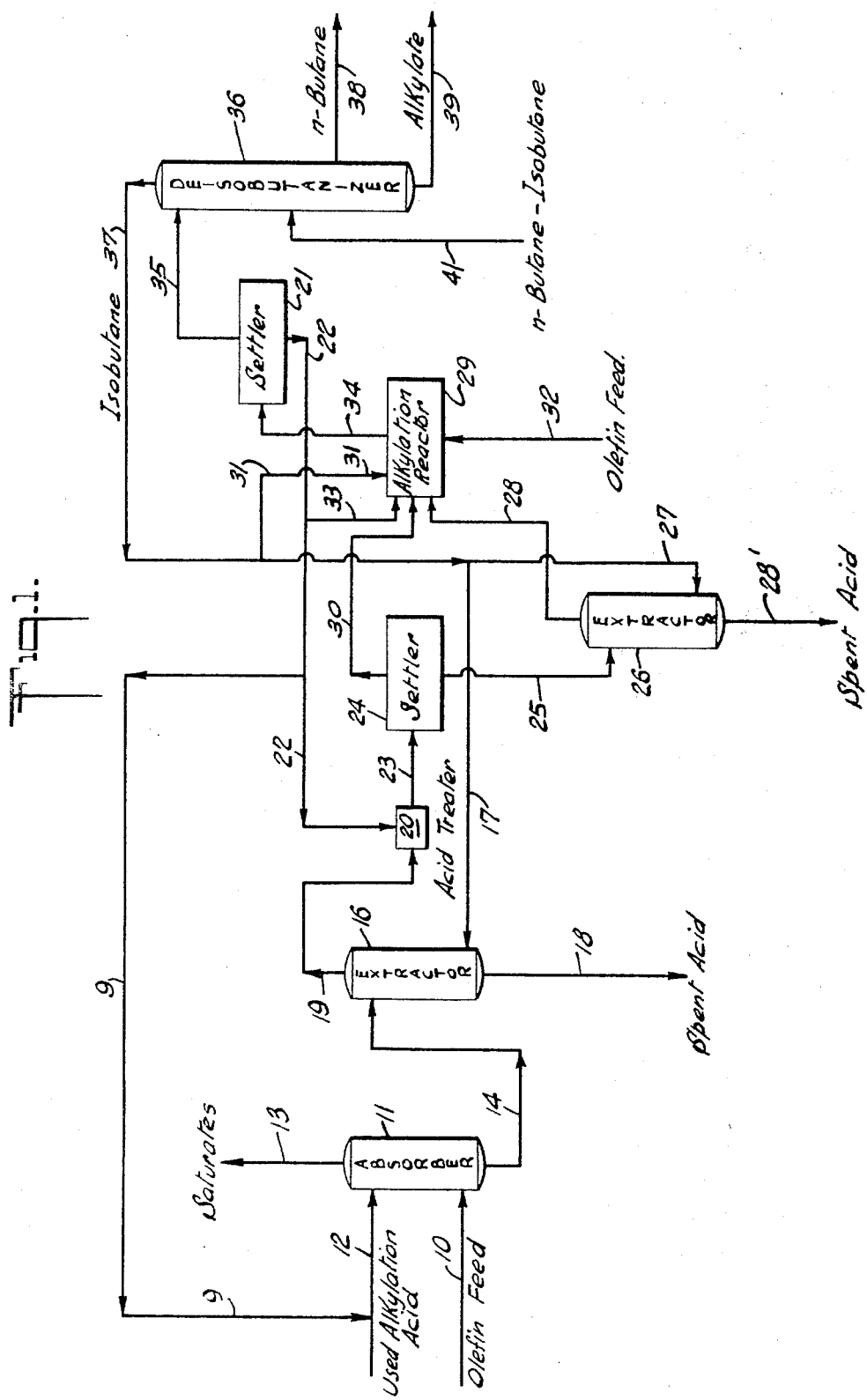

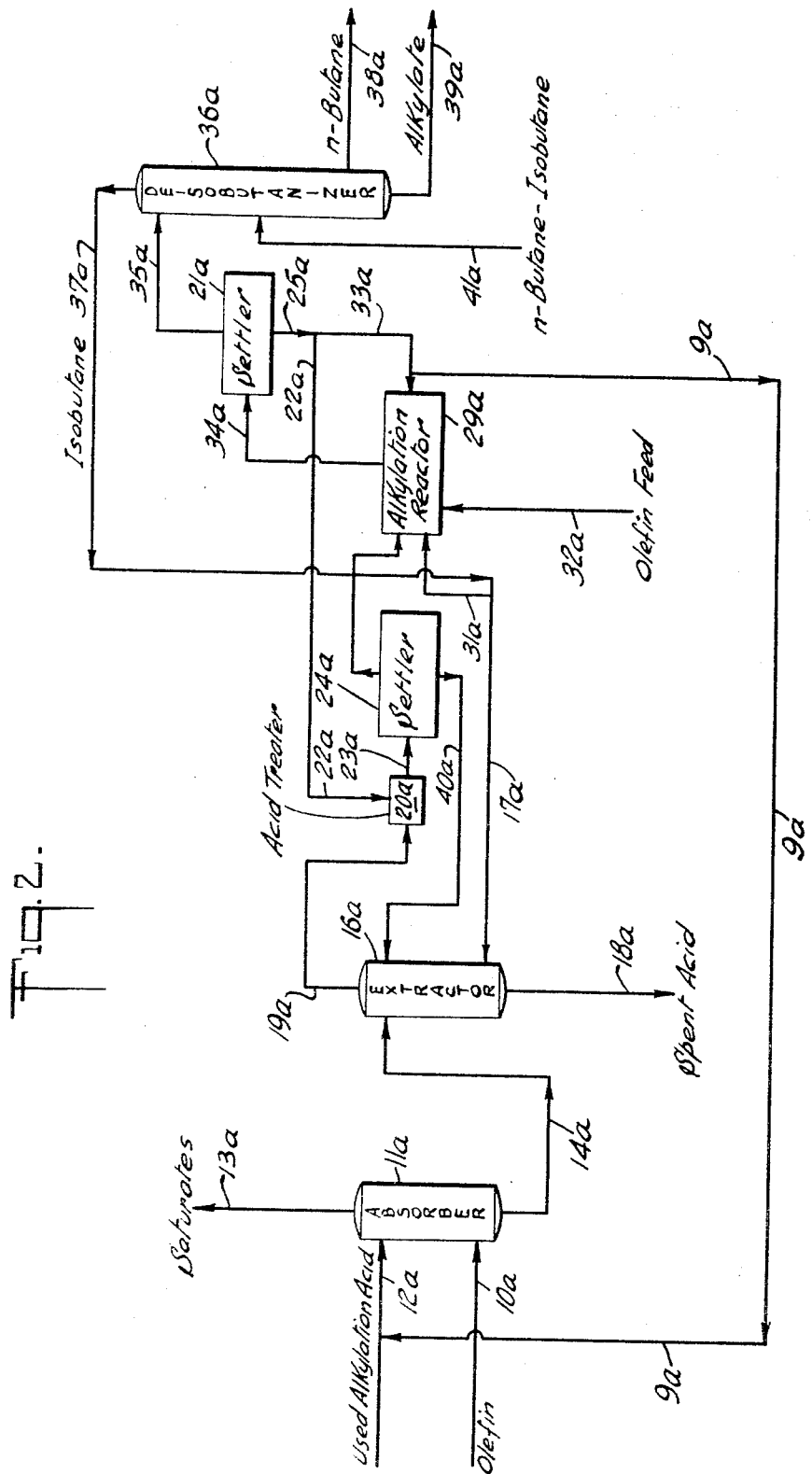

3,448,168
DIALKYL ESTER EXTRACTIONS IN AN
ALKYLATION PROCESS
Arthur R. Goldsby, Chappaqua, N.Y., assignor to Texaco
Inc., New York, N.Y., a corporation of Delaware
Continuation-in-part of applications Ser. No. 510,904,
Dec. 1, 1965, and Ser. No. 516,448, Dec. 27, 1965.
This application Dec. 7, 1966, Ser. No. 599,880
Int. Cl. C07c 3/54, 141/00
U.S. Cl. 260—683.61                              10 Claims

ABSTRACT OF THE DISCLOSURE

Used alkylation acid catalyst from the alkylation of an isoparaffin and an olefin with sulfuric acid catalyst is contacted with an olefin-containing hydrocarbon feed to form a rich acid reaction mixture containing dialkyl sulfates and alkylation reaction contaminants. The reaction mixture is extracted with an isoparaffin hydrocarbon solvent to yield a hydrocarbon phase comprising a major portion of the dialkyl sulfates in the isoparaffin solvent and a spent acid phase containing the remainder of the dialkyl sulfates and the alkylation contaminants. The hydrocarbon phase is treated with sulfuric acid to produce a treated dialkyl sulfate solution which is sent to the alkylation reaction zone and an acid phase. This acid phase is further extracted with isobutane to recover dialkyl sulfates which are also sent to the alkylation reaction zone. In a second embodiment the acid phase separated from the treated dialkyl sulfate solution is mixed with the rich acid reaction mixture and extracted simultaneously therewith with isoparaffin hydrocarbon solvent.

This application is a continuation-in-part of application Ser No. 510,904 filed Dec. 1, 1965, now abandoned and application Ser. No. 516,448 filed Dec. 27, 1965, now abandoned, both of which are continuation-in-part applications of then copending application Ser. No. 386,486 filed July 28, 1964, now U.S. Patent 3,234,301 which was a continuation-in-part of Ser. No. 50,161 filed Aug. 17, 1960, now abandoned.

This invention is directed to improvements in the alkylation of isoparaffins. More particularly, it is directed to improvements in the recovery of sulfuric acid used in chemical reactions especially in the alkylation of olefin-base materials with isoparaffins or aromatics.

U.S. Patent 3,234,301 of Feb. 8, 1966, entitled, "Sulfuric Acid Recovery Process," discloses a process for the alkylation of isoparaffins with olefins employing sulfuric acid as a catalyst. In this process an olefin is contacted with sulfuric acid in an absorber to give an absorption reaction product comprising a dialkyl sulfate of the olefin e.g. dipropyl sulfate, the acid alkyl sulfate e.g. acid propyl sulfate and an acid-oil complex. The polymer in the acid-oil complex is believed to be a product of conjunct polymerization and its inclusion in too great a concentration in any alkylation reaction causes problems of overall reaction efficiency. It is therefore necessary to remove some of the acid-oil complex from the alkylation reaction by extracting the absorption reaction product with a hydrocarbon in which the acid-oil complex is substantially insoluble, e.g. with the isoparaffin or aromatic to be alkylated. Isobutane is a preferred isoparaffin for alkylation with the olefin to form a product which can be blended in a fuel composition to give a high octane fuel. Isobutane is used to extract the absorption reaction product and forms two phases. In the isobutane phase there is dissolved the diisopropyl sulfate, the acid propyl sulfate and some minor quantities of polymeric oil and/or acid-oil complex. The extract is then treated with used alkylation acid of high sulfuric acid concentration, e.g. 88–90%, which reacts about 1:1 by weight with the polymeric oil thereby precipitating the oil. The hydrocarbon phase is then removed from the oil and charged into the alkylation reactor where the alkylate is formed. Into the alkylation reactor there can also be charged additional liquid olefin and isobutane and make-up acid.

I have found that by removing the polymeric oil by use of excess alkylation acid, e.g. sulfuric acid there is also redissolved or reabsorbed in the acid phase some of the dipropyl sulfate which is desirably sent to the alkylation reactor and not removed in the acid phase. If the dipropyl sulfate is rejected from the system together with the acid-oil complex, it represents loss of a valuable material with its resultant undesirable economic implications.

It is therefore an object of this invention to conserve the ester of alkylation acid, e.g. the dipropyl sulfate in the system and in such a manner whereby it can be utilized to its fullest extent in the alkylation reaction.

It is still another object of this invention, therefore, to provide a process which returns the alkyl sulfate absorbed in the excess alkylation acid phase to the alkylation reaction in a simple and efficient manner.

These and other objects of the invention will become apparent from the following more complete description of my invention and appended claims.

Broadly, this invention contemplates a process for alkylating an isoparaffin with an olefin in the presence of sulfuric acid catalyst which comprises:

(a) Reacting an olefin with used sulfuric acid and forming an absorption reaction product comprising a dialkyl sulfate phase and an acid absorption phase;

(b) Separating said dialkyl sulfate phase from said acid absorption phase;

(c) Treating the so separated dialkyl sulfate phase with sulfuric acid, and separating the treated dialkyl sulfate phase therefrom;

(d) Extracting dissolved dialkyl sulfate from the acid phase resulting therefrom with hydrocarbon;

(e) Separating the hydrocarbon phase formed in step (d);

(f) Charging to an alkylation reaction zone olefin, sulfuric acid catalyst and isoparaffin, and (g) Separating from an alkylation reaction zone used sulfuric acid and passing the used alkylation acid to step (a). Preferably, the dialkyl sulfate phase of step (c) and the hydrocarbon phase of step (e) are charged to an alkylation reaction zone.

The process will be more readily understood from the following description employing as the various hydrocarbons acid and olefins broadly described above specified utilizable products falling within the respective classes. Propylene is charged into an absorber into which acid is introduced preferably through a different line. An absorption reaction product comprising dipropyl sulfate, acid propyl sulfate and an acid-oil complex is formed. The absorption reaction product is withdrawn from the absorber and is passed into extractor to which is admitted a hydrocarbon which will dissolve the dipropyl sulfate and a minor quantity of the acid propyl sulfate, leaving behind most of the acid-oil complex. Desirably this hydrocarbon is one which enters into the alkylation reaction. Hence, isobutane is suitable for this purpose. The isobutane forms a hydrocarbon phase containing isobutane, dipropyl sulfate, acid propyl sulfate and a small quantity of the acid-oil complex, and an acid phase containing acid and acid-oil complex. The hydrocarbon phase is withdrawn from the acid phase or raffinate and treated with used alkylation acid, e.g. sulfuric acid having a high sulfuric or other acid content by virtue of being used alkylation acid. The strong alkylation acid generally about 88–90% or more sulfuric acid reacts 1:1 by weight with any oil in the hydrocarbon phase forming a precipitate which enables removal of the hydrocarbon phase therefrom as a liquid. The hydrocarbon phase comprises isobutane, diisopropyl sulfate and some acid propyl sulfate. The raffinate phase comprising any excess used alkylation acid unfortunately also contains some diisopropyl sulfate, as it redissolves diisopropyl sulfate in an acid phase. The used alkylation acid raffinate phase is then treated with a suitable hydrocarbon, e.g. isoparaffin or aromatic to be alkylated in order to dissolve the diisopropyl sulfate therein so that it can enter the alkylation zone along with the isoparaffin or aromatic to be alkylated. Hence, overall process efficiency is greated enhanced.

In commercial operation a design as shown in the accompanying figures provides a means whereby the invention can be performed in a simple and economical manner thereby precluding the elimination of the diisopropyl sulfate or other dialkyl acid ester from the alkylation process system.

Having set forth the general nature of the invention, it will be best understood from the more detailed description accompanying the drawings. Although the drawings illustrate general arrangements of apparatus in which the process of this invention can be practiced, it is not intended to limit the invention to the particular apparatus or materials described. It can be applied to commercial alkylation processes, such as effluent refrigeration, cascade autorefrigeration, closed cycle refrigeration, and emulsion flashing.

In the accompanying drawings, forming a part of this specification, and in which like numerals are employed to designate like parts, FIGURE 1 shows the invention in which a separate extraction vessel is used for the extraction of alkyl sulfates from the acid phase resulting from the acid treating step; and FIGURE 2 shows an embodiment in which the acid phase resulting from the acid treating step is charged to the main extraction vessel.

Referring to FIGURE 1, an olefin stream in the liquid phase comprising propylene with lesser amounts of ethylene and butylenes in admixture with saturated hydrocarbons is passed through line 10 to absorber 11. Liquid and gas formed by the exothermic heat of reaction are contacted countercurrently with descending sulfuric acid introduced into absorber 11 near the top through lines 9 and 12. The sulfuric acid absorbs propylene and butylenes forming the corresponding esters, and the remaining gases containing ethylene and saturated hydrocarbons are discharged from the top of absorber 11 through line 13. Rich acid containing absorbed olefins is withdrawn from the bottom of absorber 11 through line 14 and discharged to extraction tower 16.

In extraction tower 16 the rich acid is contacted in countercurrent flow with liquid isobutane introduced through line 17 fed by line 37. Weak acidic material containing contaminants, water and mono and dialkyl esters is withdrawn as raffinate or spent acid from the bottom of tower 16 through line 18. Extract comprising a solution of dipropyl sulfate in isobutane is withdrawn from the top of tower 16 through line 19 and passed to acid treator 20. Used alkylation acid from alkylation settler 21 is charged to acid treator 20 through line 22.

The reaction mixture from acid treator 20 is passed to settler 24 through line 23. The acid phase from settler 24 is passed through line 25 to extractor 26 at a point near the top. Isobutane is charged to extractor 26 through line 27 near the bottom. The raffinate or spent acid comprising acid-oil complex and water and substantially denuded of alkyl sulfates is discharged from extractor 26 through line 28'. The extract comprising isobutane and alkyl sulfates is passed from extractor 26 through line 28 to alkylation reactor 29.

The acid treated extract comprising isobutane and alkyl sulfates is passed from settler 24 through line 30 to alkylation reactor 29. Isobutane through line 31, olefin through line 32, and recycle or used alkylation acid through line 33 are charged to alkylation reactor 29.

Reaction mixture is passed through line 34 to settler 21. Used acid from settler 21 is passed through line 22 to acid treator 20, and through lines 22, 9 and 12 to absorber 11. Hydrocarbon comprising isobutane and alkylate are passed to deisobutanizer 36 through line 35, after neutralization in conventional manner not shown.

Isobutane is taken off the top of tower 36 and passed through lines 37 and 27 to extractor 26, through lines 37 and 17 to extractor 16, and through lines 37 and 31 to alkylation reactor 29. n-Butane is taken off as a side stream through line 38 from deisobutanizer 36. Alkylate is discharged from the bottom of deisobutanizer 36 through line 39.

Although an isostripper type fractionator 36 is shown in which reflux is furnished by introducing the fresh feed near the top of the tower, other conventional fractionation schemes can be used. Also, a depropanizer not shown is usually used in conjunction with the rest of the fractionation equipment to discharge propane from the system.

Referring to FIGURE 2, as in FIGURE 1 olefin and used alkylation acid are charged to absorber 11a. The absorption product is charged through line 14a and isobutane through lines 17a and 37a to extractor 16a. In addition, the acid phase from settler 24a following acid treater 20a comprising acid-oil complex and alkyl sulfates is passed to extractor 16a near the top through line 40a. Although not shown, if desired, some of the acid phase from settler 24a can be discarded from line 40a. With the flow of FIGURE 2 only one spent acid stream need be handled, and only one extraction tower is required. The rest of the flow for FIGURE 2 starting with alkylation reactor 29a is the same as in FIGURE 1.

With the flow of FIGURE 2 if any excess acid is added to acid treater 20a, it will have an opportunity to react with polymeric oil in extractor 16a.

No decomposition of the acid-oil complex results when the acid phase from settler 24a is introduced into the extractor 16a.

In order to illustrate more fully the nature of my invention and the manner of practicing the same, the following detailed example of my process is set forth.

EXAMPLE I

In the following example, the feed stocks shown in table are employed by the flow of FIGURE 2:

TABLE

|  | Weight percent | | |
|---|---|---|---|
|  | Isobutane | Propane-propylene | Butane-butylene |
| Ethane |  | 0.4 |  |
| Propylene |  | 62.3 | 0.1 |
| Propane | 6.9 | 33.7 | 2.7 |
| Isobutane | 91.1 | 3.6 | 34.6 |
| n-Butane | 2.0 |  | 11.0 |
| Isobutylene |  |  | 15.9 |
| Butylene-1 |  |  | 9.5 |
| Butylene-2 |  |  | 22.9 |
| Pentanes |  |  | 3.3 |
|  | 100.0 | 100.0 | 100.0 |

5 cc. per minute of used alkylation acid from alkylation settler 21a titrating 91.0% is charged to countercurrent absorber 11a near the top at 25° F. Fresh propane-propylene feed at the rate of 22.5 cc. per minute is charged to absorber 11a near the bottom at 30° F. Absorber 11a is operated at about 15 pounds per square inch gauge and 30° F. The gas evolved from the top of absorber 11a containing some unreacted propylene is condensed and charged to alkylation reactor 29a. The acid phase from absorber 11a comprising 80% dipropyl sulfate is passed to extractor 16a, near the top. 140 cc. per minute of isobutane from alkylation deisobutanizer 36a is passed to rotating disc extractor 16a near the bottom. Extractor 16a is operated countercurrently in the liquid phase at about 50° F. Overhead from extractor 16a comprising 82.0% isobutane, 6.0% dipropyl sulfate, and 0.4% propyl acid sulfate is passed to a 600 cc. mechanically agitated acid treater 20a operated in the liquid phase at 50° F. along with 0.1 cc. per minute of used alkylation acid of 91.0% concentration from alkylation settler 21a. The reaction mixture from reactor 20a is passed to settler 24a. The lower acidic phase comprising excess, unreacted sulfuric acid, reaction product of polymeric oil and sulfuric acid, and dipropyl sulfate is returned to extractor 16a near the top. The spent acid or bottoms from extractor 16a (comprising 8.0% dipropyl sulfate, 2.5% water and 80.0% propyl acid sulfate) is discarded. By operating in the manner described with return of the bottoms from settler 24a to extractor 16a the loss of dipropyl sulfate in the bottoms or spent acid from settler 24a is greatly reduced.

53.0 cc. per minute of butane-butylene feed through line 32a 175 cc. per minute of isobutane from deisobutanizer 36a, and 0.2 pound per hour of 97.5% sulfuric acid in line 25a are charged along with recycle acid from settler 21a to alkylation reactor 29a with efficient mixing at 40° F. Reaction mixture is passed to settler 21a. The hydrocarbon phase is caustic and water washed and stabilized to produce 25 gallons per day of alkylate product.

Spent acid comprising 8.0% dipropyl sulfate, 2.5% water, and 80% propyl acid sulfate is discharged from extractor 16a at a rate of 1.9 cc. per minute, which corresponds to a net overall fresh acid consumption of 0.18 pounds per gallon of alkylate.

The research octane of the stablilzed alkylate is 95.3 clear and 106.9 with 3.0 cc. of TEL. The motor octane is 92.5 clear and 106.4 with 3.0 cc. of TEL.

Using the flow of FIGURE 2, and as described in Example I above, samples of acid phase from acid treated extract were taken periodically from the bottom of settler 24a during a pilot unit run operated essentially as shown in FIGURE 2 except for the absorption section. Over an eight day period five faily samples contained 49, 44, 46, 44 and 37 percent of diisopropyl sulfate. Corresponding samples taken from the bottom of extractor 16a using the herein described invention showed 2, 6, 5, 1, 5, 11, 8, 6, 10, 6 and 10 percent of diisopropyl sulfate. These data indicate that the diisopropyl sulfate is largely removed from the acid phase resulting from the acid treated extract by subjecting it to the extracting action with isobutane in extractor 16a.

It was shown on acid phase samples from runs taken from settler 24a operated according to FIGURE 2 and on other corresponding samples from settler 24 operated according to FIGURE 1 containing 35 to 68 percent diisopropyl sulfate that substantially all of the diisopropyl sulfate could be removed from the samples by successive batch extractions with either isopentane or n-hexane.

For simplification the description of the invention has been made quite brief up to this point. However, some additional comments will be made regarding the various steps of the process in their order of use to give a better idea of its scope and conditions of operation.

Absorption

In the absorption step propylene is preferred as the olefin feed stock, although higher molecular weight olefins can be used, especially the butylenes and amylenes.

The absorption can be carried out in either vapor or liquid phase, or in a combination of the two. For example, the bulk of the absorption may be carried out in the vapor phase, followed by liquid phase for the final portion of the absorption step for a high conversion of the acid to dialkyl sulfates.

Used alkylation acid having a titratable acidity of 88–93% by weight is the preferred acid charge stock for the absorption step, although in some cases, for example, if amylenes are being alkylated, it may have a concentration as low as 80–95%. Acid from other sources, such as fresh acid, or acid from chemical reactions, and acid from the acid treatment of petroleum naphtha or lube oil may also be used. Although strong acid such as used alkylation acid is the preferred acid, weaker acids, such as those used in alcohol manufacture may be used if the conditions are adjusted. For example, acid having a titratable acidity of about 80% and containing about 20% of water may be used at about 160° F. with propylene.

When using strong acid with propylene, a temperature of 20–60° F. is satisfactory. When butylenes are used, especially isobutylene or isobutylene containing charge stocks, quite low temperatures and short times are advantageous. The isobutylene may be first removed by weak acid, if desired, as disclosed in my copending application Ser. No. 516,448, filed Dec. 27, 1965.

Relatively concentrated olefin stocks such as those from catalytic cracking are preferred, although from an economic standpoint lean stocks such as lean propylene stock having only a value of fuel are advantageous and are satisfactory.

The absorption step can be effected in contacting equipment well known in the art, for example mixer-setlers, centrifugal contractors, countercurrent towers or two or more mechanically stirred reactors operating to give countercurrent flow. Countercurrent contacting is preferred in order to obtain a high conversion of the acid to dialkyl sulfates, and in most cases for a high conversion of the olefin.

Separation of absorption product

The separation of the dialkyl sulfates from the acid-oil reaction product and water can be made in a variety of ways, as disclosed in U.S. 3,227,774 of Jan. 4, 1966 to A. R. Goldsby entitled Sulfuric Alkylation Acid Recovery. For example, the absorber reaction mixture can be diluted with a large quantity of water, extracted with a hydrocarbon, such as isobutane, or a hydrocarbon solution may be chilled.

In general, it is easier to extract the dialkyl sulfate than the alkyl acid sulfate with a hydrocarbon solvent. Thus, it is desirable to use quite good and efficient conditions in the extraction step so as to extract not only the dialkyl sulfate, but also as much of the alkyl acid sulfate as possible. For example, a high solvent to dialkyl sulfate ratio on the order of six or higher and countercurrent operation are advantageous. It is the objective to approach as nearly as possible only acid-oil reaction product and water in the spent acid or acid phase, with all of the alkyl sulfates in the extract or organic phase.

When the separation of absorption mixture is made by hydrocarbon extraction, a relatively low temperature in the range of 40–60° F., is preferred, although somewhat lower or higher temperatures can be used. The main extraction step on the absorber reaction product can be effected in equipment known in the art, for example, mixer settlers, centrifugal contactors or countercurrent towers, for example, a Rotating Disc Contactor.

The raffinate or spent acid from the extraction step will comprise water, alkyl acid sulfate, dialkyl sulfate and the reaction product of acid and polymeric oil formed during the alkylation, absorption, and acid treating steps. The extract comprises the hydrocarbon solvent, dialkyl sulfate and a limited amount of alkyl acid sulfate.

Acid treating

The polymeric oil is quite unsaturated and it reacts readily with strong sulfuric acid, such as fresh make-up acid used for the alkylation step, or used alkylation acid of about 90% concentration. Weaker acid, for example, acid of about 80% concentration may be used, but considerably more acid, in excess, is required. When weaker acid is used, more of the alkyl sulfates become dissolved in the excess acid. As a result, the invention of extracting the acid phase with a hydrocarbon solvent is of even greater advantage when weaker acid is used. The acid-oil reaction product or complex and the alkyl sulfates are surprisingly stable under the conditions of operation. For example, quite good results have been obtained by acid treating in isobutane solution with used alkylation acid of about 90% concentration at a temperature of 85° F. and a time as long as one hour. However, a temperature not over about 40-60° F. and a short time on the order of a few minutes or less are preferred.

If enough excess acid, a long enough time and a high enough temperature are used, adverse reactions, such as conversion of the dialkyl sulfate to alkyl acid sulfate and hydropolymerization could result. Hence minimum time, temperature and acid are advantageous.

The acid-oil reaction product is viscous but is free flowing under gravity conditions under the conditions of operation.

Extraction of acid phase

In general, reasonably low temperatures and reasonably short times are preferred for the hydrocarbon extraction of the acid phase from the acid treating step. For example, a temperature range of 30-60° F. with a few minutes residence time is satisfactory. However, reasonably good results have been obtained at ambient temperatures as high as 85-100° F. The conditions will depend somewhat upon the absorption product and the olefin used for the absorption step, and whether the absorption product is treated directly with acid or separated first from the dialkyl sulfates. When the operation is as in FIGURE 1 or 2 and the isobutane extract is acid treated, the dialkyl sulfates in the acid phase are quite stable. When the isobutane extract as shown in FIGURES 1 and 2 is acid treated, somewhat higher temperatures and longer times may be used for the extraction of the acid phase than if the absorption product is acid treated directly and the separated acid phase is extracted.

A high solvent to dialkyl sulfate ratio is advantageous, for example, on the order of six or higher. Extraction in countercurrent operation is also advantageous.

Alkylation

In general the conditions for the alkylation step are those which are well known in the art. However, the bulk of the make-up acid is charged to alkylation as alkyl sulfates which result from the recovery section, and only a minor proportion of the acid is charged as the fresh make-up acid of the usual 98-99.5% concentration. Since the alkyl sulfates are substantially water free the trend is for the system catalyst, when using the acid recovery process, to be of lower water content and, in general, of superior quality in that a lower end point alkylate of higher octane value is obtained. Of course, if desired, less drying of charge stocks may be used, and in such a case the water content of the system catalyst could be as high as in conventional operation without acid recovery. The sulfuric acid in the alkylation system is usually maintained within a range of about 88-95% by purging spent acid from the system. In a multiple reactor system the acid of the lowest concentration will be purged and sent to the acid recovery system.

A large excess of isobutane is used, for example, as much as 60-80 volume percent of the hydrocarbons in the alkylation reaction mixture. Consequently, a large quantity of isobutane must be recovered and recycled for reuse in the alkylation process. A portion of this same recycle isobutane may be used for the extraction of the acid phase for the invention in question, and also for the major extraction step to remove alkyl sulfates in the acid recovery process.

In addition to the olefin which is charged to the alkylation step in the form of alkyl sulfates additional fresh olefin is usually charged to the alkylation step. For example, when propylene and/or butylenes, and especially propylene, are used for the absorption step, it is advantageous to use butylenes also in the alkylation step.

In the simplest application of the invention when operated directly in combination with an alkylation unit the used alkylation acid is charged to the absorber for reaction with olefin, and dialkyl sulfate product is charged to alkylation. However, there are many different specific ways in which my invention may be used, for example, because of existing conditions or because of charge stocks, especially when used in combination with alkylation when more than one alkylation unit or reactor is operated, as exemplified by but not limited to the following with two alkylation units, A and B and recovery unit R.

(1) Used acid from A and B is charged to R and recovered acid from R is charged only to B.

(2) Used acid from A is charged to R and used acid from B is charged to A, and recovered acid from R is charged to B.

(3) Used acid from A is charged to B and used acid from B is charged to R, and recovered acid from R is charged to A.

(4) Used acid from A and B is charged to R, and recovered acid from R is charged to A and B.

(5) When applied to two alkylation reactors A and B (rather than to two alkylation units A and B) operated in series on acid with a single settler for both reactors, used acid from A is charged to B, used acid from B is charged to R, and recovered acid from R is charged to A. In principle this is the same as (2) above. It is the same principle also as in a multi reaction zone reactor such as in a cascade reactor with series flow of hydrocarbon and emulsion with only a final settler, or in a multiple reactor unit with parallel flow of hydrocarbon and emulsion with a settler for each reactor or pair of reactors.

In any of the above general modifications a part of the acid sent to recovery R may be from another source, including non-alkylation sources, and not from sources A and B.

What is claimed is:
1. A process for alkylating an isoparaffin with an olefin in the presence of sulfuric acid catalyst which comprises:
 (a) reacting an olefin with used sulfuric acid and forming a rich acid absorption product comprising a dialkyl sulfate phase and an acid absorption phase;
 (b) separating said dialkyl sulfate phase from said acid absorption phase by extraction with an isoparaffin hydrocarbon, thereby obtaining a first hydrocarbon extract phase containing dissolved dialkyl sulfates and a first raffinate acid;
 (c) treating said first hydrocarbon extract phase with sulfuric acid, and separating a treated dialkyl sulfate phase and an acid phase therefrom:
 (d) extracting dissolved dialkyl sulfate from said acid phase from step c with an isoparaffin hydrocarbon thereby obtaining a second hydrocarbon extract phase and a second raffinate acid;
 (e) separating said second hydrocarbon extract phase formed in step d;
 (f) charging to an alkylation reaction zone said treated dialkyl sulfate phase of step c, said second hydrocarbon extract phase of step e, olefin, sulfuric acid catalyst and isoparaffin;
 (g) separating from an alkylation reaction zone used sulfuric acid and passing the used alkylation acid to step a.

2. A process according to claim 1 wherein said used sulfuric acid in step a has a concentration of at least 85%.

3. A process according to claim 1 wherein said olefin in step a contains propylene.

4. A process according to claim 1 wherein the separation of step b is made by extraction with isobutane.

5. A process according to claim 1 wherein the extraction in step b is carried out at a temperature in the range of 30-60° F.

6. A process according to claim 1 wherein the sulfuric acid employed in step c is used alkylation acid.

7. A process according to claim 1 wherein said sulfuric acid in step c is used alkylation acid and is present in an amount in excess of the amount of polymeric oil in said hydrocarbon phase on a weight basis.

8. A process according to claim 1 wherein the isoparaffin hydrocarbon solvent used to extract dissolved dialkyl sulfate in step d is isobutane.

9. A process according to claim 1 wherein said dissolved dialkyl sulfate is extracted in step d from said acid phase from step c in the same extraction zone in which said dialkyl sulfate phase of step a is extracted in step b from said acid absorption phase with an isoparaffin solvent.

10. A process which comprises reacting an olefin with sulfuric acid thereby forming an absorption reaction product comprising a dialkyl sulfate phase and an acid absorption phase, extracting said dialkyl sulfate phase from said acid absorption phase with an isoparaffin hydrocarbon to produce a first hydrocarbon extract solution of dialkyl sulfate and a first raffinate acid, treating said first hydrocarbon extract with sulfuric acid thus forming an acid phase comprising dialkyl sulfate and a treated first hydrocarbon extract solution of dialkyl sulfate, recovering said treated first hydrocarbon extract solution, extracting dialkyl sulfate from said acid phase with isoparaffin hydrocarbon solvent thus forming a second hydrocarbon extract solution of dialkyl sulfate and a second raffinate acid, and recovering said second hydrocarbon extract solution of dialkyl sulfate.

References Cited

UNITED STATES PATENTS

| 2,381,041 | 8/1945 | De Jong | 260—683.61 |
| 3,227,775 | 1/1966 | Goldsby | 260—683.61 |
| 3,234,301 | 2/1966 | Goldsby | 260—683.61 |

DELBERT E. GANTZ, *Primary Examiner.*

G. J. CRASANAKIS, *Assistant Examiner.*

U.S. Cl. X.R.

260—683.62